(12) United States Patent
Kambhammettu et al.

(10) Patent No.: US 11,620,270 B2
(45) Date of Patent: Apr. 4, 2023

(54) REPRESENTING AND MANAGING SAMPLED DATA IN STORAGE SYSTEMS

(71) Applicant: Hewlett Packard Enterprise Development LP, Houston, TX (US)

(72) Inventors: Sri Satya Sudhanva Kambhammettu, Bangalore Karnataka (IN); Narayanan Ananthakrishnan Nellayi, Bangalore Karnataka (IN); Anoop Kumar Raveendran, Bangalore Karnataka (IN); Subhakar Vipparti, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/302,019

(22) Filed: Apr. 21, 2021

(65) Prior Publication Data

US 2022/0035784 A1      Feb. 3, 2022

(30) Foreign Application Priority Data

Jul. 31, 2020   (IN) .............................. 202041032891

(51) Int. Cl.
G06F 16/22      (2019.01)
G06F 16/2453    (2019.01)
G06F 16/23      (2019.01)
G06F 16/21      (2019.01)

(52) U.S. Cl.
CPC .......... G06F 16/2237 (2019.01); G06F 16/21 (2019.01); G06F 16/2358 (2019.01); G06F 16/2453 (2019.01)

(58) Field of Classification Search
CPC .................................................. G06F 16/2237

USPC ......................................................... 707/698
See application file for complete search history.

(56) References Cited

U.S. PATENT DOCUMENTS

| | | | |
|---|---|---|---|
| 7,076,622 B2 | 7/2006 | Hsu et al. | |
| 8,615,499 B2 | 12/2013 | Chambliss et al. | |
| 8,825,971 B1 * | 9/2014 | Auchmoody | G06F 3/0608 |
| | | | 711/162 |
| 9,424,285 B1 | 8/2016 | Condict et al. | |
| 9,977,746 B2 | 5/2018 | Muppalaneni et al. | |
| 10,169,365 B2 | 1/2019 | Maheshwari | |
| 10,198,455 B2 | 2/2019 | Harnik et al. | |
| 10,303,662 B1 * | 5/2019 | Menezes | G06F 16/9535 |
| 10,459,884 B1 | 10/2019 | Godman | |

(Continued)

FOREIGN PATENT DOCUMENTS

EP      3311312 A1    4/2018

OTHER PUBLICATIONS

Antoshenkov, G., "Byte-Aligned Bitmap Compression", Proceedings DCC '95 Data Compression Conference, Mar. 1995, 1 page.

(Continued)

*Primary Examiner* — Syling Yen

(74) *Attorney, Agent, or Firm* — Trop, Pruner & Hu, P.C.

(57) ABSTRACT

Example implementation relates to generating a database for a set of entities associated with sampled data units of a storage system. A first data structure in the database maps, in a bit vector, each entity with a sampled signature of a set of sampled signatures. The set of sampled signatures are (Continued)

associated with the sampled data units. The set of entities associated with the set of sampled signatures are managed using the first data structure.

17 Claims, 8 Drawing Sheets

(56) References Cited

U.S. PATENT DOCUMENTS

| | | | |
|---|---|---|---|
| 10,552,373 | B2 | 2/2020 | Brow et al. |
| 10,860,232 | B2 | 12/2020 | Vaithianathan et al. |
| 11,307,788 | B2 | 4/2022 | Goswami et al. |
| 2016/0371296 | A1* | 12/2016 | Passey .................. G06F 16/185 |
| 2018/0246649 | A1 | 8/2018 | Datar et al. |

OTHER PUBLICATIONS

Harnik, D., et al., "Sketching Volume Capacities in Deduplicated Storage", Proceedings of the 17th USENIX Conference on File and Storage Technologies (FAST '19), Feb. 25, 2019, pp. 107-119.

Lemire, D., et al., "Consistently faster and smaller compressed bitmaps with Roaring", Journal of Software: Practice and Experience), Mar. 2, 2018, 24 pages.

Lemire, D., et al., "RoaringBitmap",GitHub, available online at <https://github.com/RoaringBitmap/RoaringBitmap/tree/ab5398126f7aed1e85ba3831e9d0f05372738c28>, Jul. 2, 2020, 13 pages.

Qumulo, "Qumulo File System", available onlibe at <https://web.archive.org/web/20200618113921/https://qumulo.com/product/file-system/>, Jun. 18, 2020, 14 pages.

Qumulo, "Qumulo's Distributed File System: Analytics", available online at <https://qumulo.com/discover/technical-guide/analytics/>, Apr. 20, 2021, 7 pages.

Qumulo, "Qumulo's Distributed File System: Quotas", available online at <https://qumulo.com/discover/technical-guide/quotas/>, Apr. 20, 2021, 5 pages.

Qumulo, "Qumulo's Distributed File System: Scalability", available online at <htttps://qumulo.com/discover/technical-guide/scalability/>,Apr. 20, 2021, 8 pages.

El-Shimi, A., et al.; "Primary Data Deduplication—Large Scale Study and System Design"; Jun. 2012; 12 pages; Microsoft Corporation, Redmond, WA, USA.

* cited by examiner

| SIGNATURES | | S1<br>R1=5<br>Idx 0 | -<br>0<br>Idx 1 | S4<br>R4=3<br>Idx 2 | S7<br>R7=4<br>Idx 3 | -<br>0<br>Idx 4 | S6<br>R6=4<br>Idx 5 | S5<br>R5=1<br>Idx 6 | -<br>0<br>Idx 7 | S3<br>R3=2<br>Idx 8 | S2<br>R2=3<br>Idx 9 | -<br>0<br>Idx 10 |
|---|---|---|---|---|---|---|---|---|---|---|---|---|
| ENTITIES | E1 | 1 | 0 | 1 | 0 | 0 | 1 | 0 | 0 | 0 | 0 | 0 |
| | E2 | 0 | 0 | 1 | 1 | 0 | 1 | 1 | 0 | 0 | 1 | 0 |
| | B1E1 | 1 | 0 | 0 | 0 | 0 | 0 | 0 | 0 | 1 | 1 | 0 |
| | C1B1E1 | 0 | 0 | 1 | 1 | 0 | 1 | 0 | 0 | 1 | 0 | 0 |
| | B2E1 | 1 | 0 | 0 | 0 | 0 | 0 | 0 | 0 | 0 | 0 | 0 |
| | B1E2 | 1 | 0 | 0 | 1 | 0 | 1 | 1 | 0 | 1 | 0 | 0 |
| | E3 | 1 | 0 | 0 | 1 | 0 | 1 | 0 | 0 | 0 | 1 | 0 |

FIG.2A

| ENTITY E1 | |
|---|---|
| SIGNATURE | REF. COUNT |
| S1 | 2 |
| S3 | 4 |

FIG.2B

| Free Pointer:Idx1 | | |
|---|---|---|
| INDEX | SIGNATURE | REF. COUNT |
| 0 | S2 | R1 |
| 1 | Idx:4 | 0 |
| 2 | S4 | R4 |
| 3 | S7 | R7 |
| 4 | Idx:7 | 0 |
| 5 | S6 | R6 |
| 6 | S5 | R5 |
| 7 | Idx:10 | 0 |
| 8 | S3 | R3 |
| 9 | S2 | R2 |
| 10 | Idx:Null | 0 |

FIG.2C

REPRESENTING AND MANAGING SAMPLED DATA IN STORAGE SYSTEMS

BACKGROUND

Data deduplication removes redundant data to improve storage space utilization. In storage systems implementing data deduplication, duplicate data units (i.e., data units having the same data at different locations on a storage device) are deleted from the storage device.

When data deduplication is performed on the storage system, one unique (or distinct) instance of the data units is stored. The other instances of the same data contain a reference to the unique instance of the data units. Hence, data deduplication reduces the storage capacity requirement by reducing the number of data units which need to be stored. This results in reduction of the required storage resources and reduces the overall cost of the storage system.

BRIEF DESCRIPTION OF THE DRAWINGS

The drawings provide examples and/or implementations consistent with the description; however, the description is not limited to the examples and/or implementations provided in the drawings.

FIGS. 2A, 2B and 2C illustrate components of a database in the storage system, in accordance with examples of the present disclosure.

DETAILED DESCRIPTION

Figure 1:
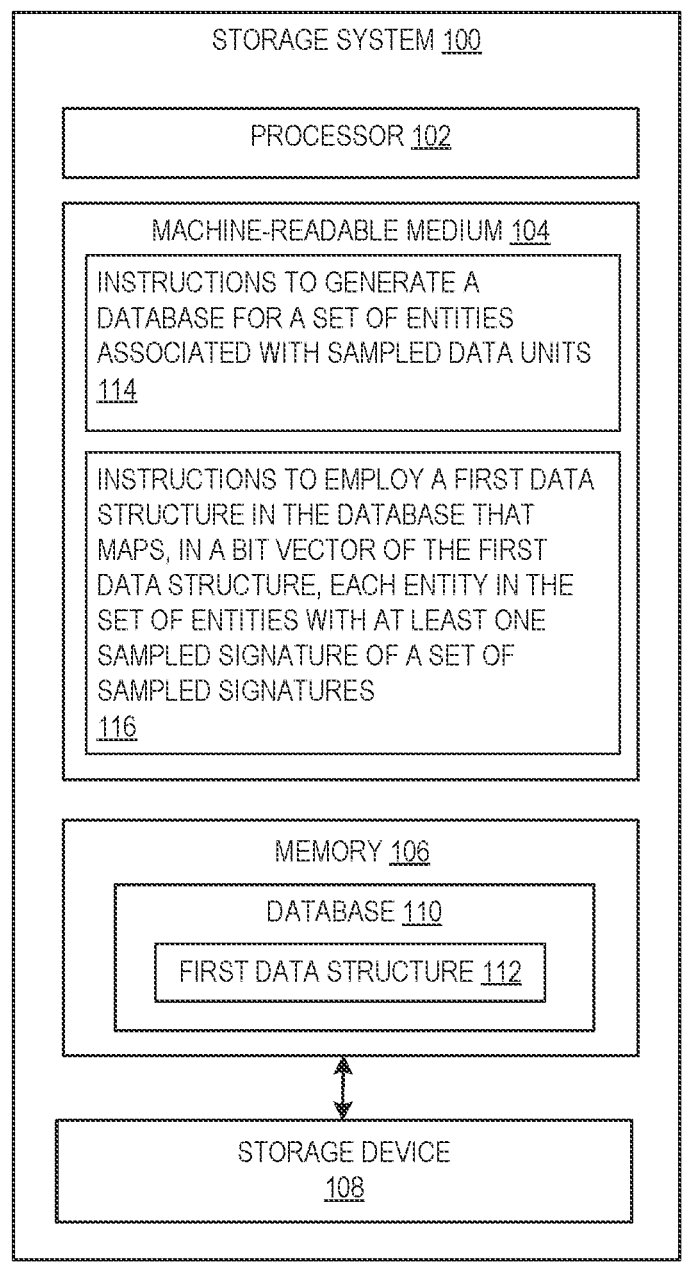
FIG. 1 illustrates a block diagram of a storage system, in accordance with examples of the present disclosure.

The following detailed description refers to the accompanying drawings. Wherever possible, the similar reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing example embodiments only and is not intended to be limiting. As used herein, the singular forms "a," "an," and "the" are intended to include the plural forms as well, unless the context clearly indicates otherwise. The term "plurality," as used herein, is defined as two, or more than two. It will also be understood that, although the terms first, second, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

As used herein, "a parent entity" refers to either a file-system, a file or a block volume. "Snapshot" refers to a snapshot of the parent entity or snapshot of a clone i.e. a file system snapshot, file snapshot or a block level snapshot of the volume respectively. "Clone" refers to a clone of the parent entity or a clone of a snapshot, i.e. clone of a file system or a block level clone of the volume respectively.

In some implementations, the parent entity, the clone, and the snapshot used herein refers to a storage representation of a virtual machine (VM) in a virtualized environment.

A "live entity" (also referred to as a "writable entity") may refer either to a parent entity or to a clone. A "read-only entity" refers to snapshots of the writable entity (parent entity or clone).

As used herein, "data units" refers to data blocks in a volume, data files in a file system, data objects in an object-based storage system, or any other unit of data used for storing data in a storage system.

In general, estimation of unique space present in storage system is performed on a subset of data units of the storage system and results are extrapolated to compute the unique space in the storage system. The subset of data units are the data units which meet a predefined sampling criteria. The subset of data units meeting the sampling criteria may be processed to determine a unique signature associated with each sampled data unit. Unique data units in the sampled data units associated with the set of entities may be estimated by comparing a reference count of a sampled signature associated with each sampled data unit with a system level reference count of the sampled signature.

For processing queries related to estimation of unique space occupied by multiple entities, the sampled signatures associated with the multiple entities along with the reference counts of the sampled signatures are retrieved. The operation including retrieval of the reference count of the sampled signatures from individual entities, performing sum of the reference counts associated with each sampled signature and finally the comparison of the reference count of each sampled signature with the system level reference count of the sampled signature may require significant time and resources of the processor in the storage system. This leads to increase in the cost of query processing.

Moreover, the estimation of unique space in storage systems may be complicated in the presence of block sharing between entities. Further, intra-entity deduplication and presence of clones and snapshots in storage system may add further complexities to the operations performed.

To address the cost and operation complexity while processing queries on storage system and to improve time for retrieval of entity related data and comparison operation, it may be useful if the sampled data units are stored in a format which facilitates faster operation and requires minimal I/O resources.

Examples described herein may relate to a storage system that stores and represent sampled data units in a database. The database may be generated for a set of entities associated with sampled data units of the storage system. A first data structure in the database maps, in a bit vector, each entity with a sampled signature of a set of sampled signatures. The set of sampled signatures are associated with the sampled data units. The set of entities associated with the set of sampled signatures are managed using the first data structure.

Queries received at the database may be processed based on the bit vectors storing the mapping of the entities against the sampled signatures. Queries received may be related to unique space computation or entity specific queries. When a query is received for determining unique space in a subset of entities, a first reference count of each of the sampled signature in the set of signatures associated with the subset of entities may be computed by performing a summation operation of the bit vectors of entities mapping each of the sampled signature in the subset of entities. Thus, the bit vector type of mapping allows faster bulk retrieval of data and processing of data (summation operations) corresponding to sampled signatures.

Referring now to the figures, FIG. 1 illustrates an example of a storage system 100. The storage system 100 includes a processor 102, a machine-readable medium 104, a memory 106, a storage device 108, and a database 110. The processor 102 may be implemented as one or more microprocessors, microcomputers, microcontrollers, digital signal processors, central processing units, state machines, logic circuitries, and/or any devices that manipulate signals based on operational instructions. Among other capabilities, the processor 102 may fetch and execute computer-readable instructions stored in a memory. The functions of the processor 102 may be provided through the use of dedicated hardware as well as hardware capable of executing machine-readable instructions. The memory 106 may include any non-transitory computer-readable medium including, for example, volatile memory (e.g., RAM), and/or non-volatile memory (e.g., EPROM, flash memory, a hard disk drive, etc.). The processor 102 may be configured to execute instructions (i.e. programming or software code) stored in the machine-readable medium 104 to perform the functions of the storage system 100 as described herein. For example, the machine-readable medium 104 may include instructions 114 and 116. The instructions 114 when executed causes the processor 102 to generate the database 110 for a set of entities associated with sampled data units of the storage device 108. The instructions 116 when executed causes the processor to employ a first data structure 112 to map each entity with at least one sampled signature in a bit vector of the first data structure 112. Although the FIG. 1 shows only two instructions, it should be understood that several instructions may be stored in the machine-readable medium.

The processor 102 is configured for storing and managing data present in the storage device 108. The data units in the storage device 108 are selectively sampled based on a sampling criteria using a scanner (not shown in the FIG. 1). The data units meeting the sampling criteria are sampled and the information related to sampled data units is stored in the database 110. The sampling may be performed during data ingest or by periodically scanning the storage device 108 for changes. In an example implementation, once the database 110 is ready, the sampling is performed during data ingest on the storage device 108.

Each of the sampled data units may be identified by a sampled signature. The sampled signature of the sampled data units may be a cryptographic digest of the content of that sampled data unit, using a hash function such as SHA-1, SHA-256, MD5, etc.

The database 110 may employ a first data structure 112 to store information related to the sampled data units. Each entity in a set of entities is mapped to at least one sampled signature associated with the sampled data unit on the storage device 108. The set of signatures are associated with set of sampled data units. The set of entities associated with the set of sampled signatures are managed using the information in the database 110. More information related to the first data structure 112 and the mapping between entities and sampled signatures is described in figures below.

As only signature information related to the sampled data units is stored in the database 110, size of the database 110 is minimized and the processor resources for accessing data from the database 110 may also be minimized.

The database 110 may receive queries related to unique space occupied by entities, rate of change in entities, uniqueness of snapshots etc. The queries received at the database 110 are processed by the processor 102 using the mapping information in the first data structure 112.

In an implementation, the database 110 may be generated in the memory of the storage system 100 for sampled data units of the storage device 108. The database 110 is continuously updated during data ingest to ensure that the database 110 may be queried to retrieve correct information. Data units (being written or rewritten) matching the sampling criteria are continuously sampled during data ingest. Further, the information in the database 110 is updated based on the changes in the sampled data units during I/O operations. Further, the database 110 gets updated when a new entity is detected in the storage system.

The storage device 108 may be any mass storage device. The mass storage device may be different types of storage such as disks, flash memory, solid-state drives (SSDs), etc.

Representing Sampled Data Units in Database

FIGS. 2A, 2B, and 2C illustrate components of the database 110 in the storage system 100, in accordance with examples of the present disclosure. Referring now to, FIG. 2A is an example visualization of the first data structure 112 maintained in the database 110. The first data structure 112 maintains a mapping between a set of entities found in the sampled data units and a set of sampled signatures associated with each of the sampled data units using bitmaps. Each entity in the first data structure 112 may be mapped to at least one sampled signature in the set of sampled signatures. The set of signatures are associated with the sampled data units. Each sampled signature may have a reference count indicating the number of entities referring to the sampled signature. Each sampled signature is associated with a signature index (Idx) in the database 110. The association between an entity and a sampled signature may be created using a bitmap entry in the first data structure 112. A bit vector maps each entity to one or more sampled signatures and each bit vector is stored as a bit vector file. The bit-vector files in the first data structure 112 may be stored in a compressed format to minimize the space required for the first data structure 112 in the memory 106. In an implementation, the bit vectors may be stored in a compressed format when the bit vectors in the first data structure 112 become sparse.

The FIG. 2A illustrates a set of sampled signatures including S1, S2, S3, S4, S5, S6 and S7. In the FIG. 2A three parent entities E1, E2 and E3 are mapped to respective sampled signatures. B1E1 may be a first snapshot of the parent entity E1, B2E1 may be a second snapshot of the parent entity E1. C1B1E1 may be a clone derived from the first snapshot B1E1. B1E2 may be the first snapshot of parent entity E2. In the bit vector mapping shown in FIG. 2A, a "1" indicates the presence of a sampled signature and "0" indicates absence of a sampled signature. For instance, the bit vector corresponding to (E1, S4) is "1" indicating that parent entity E1 is associated with sampled signature S4. Similarly, a "0" indicates the absence of the signature. For example, the bit vector corresponding to (E1, S7) is "0" which indicates that signature S7 is not associated with parent entity E1. Each sampled signature may have a reference count indicating the number of entities referring to the sampled signature. The reference count is computed by performing a sum of bits in the column corresponding to each of the sampled signature found in the set of entities. For instance, in FIG. 2A the reference count of signature S1 is "R=5". The signature S1 is present in sampled data units associated with five entities— E1, B1E1, B2E1, B1E2, and E3.

This reference count is updated based on the changes in the sampled signatures associated with the set of entities in the first data structure 112.

When a new entity is detected, the first data structure 112 is updated with mapping of the new entity and a sampled signature. The new entity can be a parent entity, a snapshot of parent entity or a clone of the parent entity. Each new entity is mapped to a sampled signature and the mapping is stored as a bit vector in the first data structure 112.

Although the FIG. 2A illustrates that the set of entities in the storage system 100 comprises of parent entities, snapshots and clones, there may be storage systems which do not support snapshots and clones. In an implementation of storage system, the set of entities may include parent entities and snapshots. In another implementation of a storage system, the set of entities may include only parent entities.

FIG. 2B is an example visualization of a second data structure maintained in the database 110. The second data structure is an auxiliary data structure employed to account for intra-entity deduplication during I/O operations on the sampled data units. The second data structure may be generated for each parent entity or clone when a sampled signature associated with the entity has intra-entity reference count greater than 1. The second data structure includes an intra-entity reference count for the sampled signatures referred by the entity. From the FIG. 2B it can be seen that the sampled signature S1 has been referred twice and sampled signature S3 four times by parent entity E1.

In an example implementation, elements of the second data structure include the parent entity, the signature index (Idx) associated with the sampled signature, and the intra-entity reference count of the sampled signature. The second data structure does not include snapshots as no I/O operations occur on snapshots. However, in case a clone is derived from the snapshot, an intra-entity reference count is maintained for the snapshot.

It is noted that although the FIG. 2B shows an intra-entity reference count maintained for a parent entity, the intra-entity reference count for clones may be maintained in the second data structure.

In most storage systems, intra-entity deduplication is low and thus, the size of the second data structure is small. Further, in storage systems which have block sharing only due to snapshots and clones, intra-entity deduplication need not be tracked.

When a new sampled signature is detected in the sampled data units of an entity, the processor 102 may check if the new sampled signature is present in the sampled signatures in the second data structure of the sampled signatures of the entity. If the new sampled signature is present in the second data structure, the intra-entity reference count for the sampled signature is incremented. If the new sampled signature is not present in the second data structure, a mapping for the new signature with the entity is created in the first data structure 112. The mapping of the new signature to entities in the first data structure 112 ensures that the sampled information present in database 110 is accurate. In storage systems which implement block sharing only due to snapshot/clones, intra-entity reference count of sampled signatures need not be tracked and the second data structure would not be required.

FIG. 2C illustrates an example of a third data structure in the database 110. The third data structure maps each sampled signature to a fixed column (or an index) and a second reference count. The second reference count is the number of entities referring to a given signature. In an example embodiment, the elements in the third data structure includes the sampled signature, the signature index associated with the sampled signature, and a second reference count of the sampled signature. When a sampled signature is added (or removed) from an entity due to I/O operations, the corresponding second reference count of the sampled signature is adjusted. When the second reference count of a signature becomes zero, the signature index associated with the sampled signature may be re-used for other sampled signatures. The re-usable indexes may be tracked using a linked list. In the FIG. 2C, indexes 1, 4, 7 and 10 are free and may be reused.

Hierarchical Directory Structure

Figure 3:
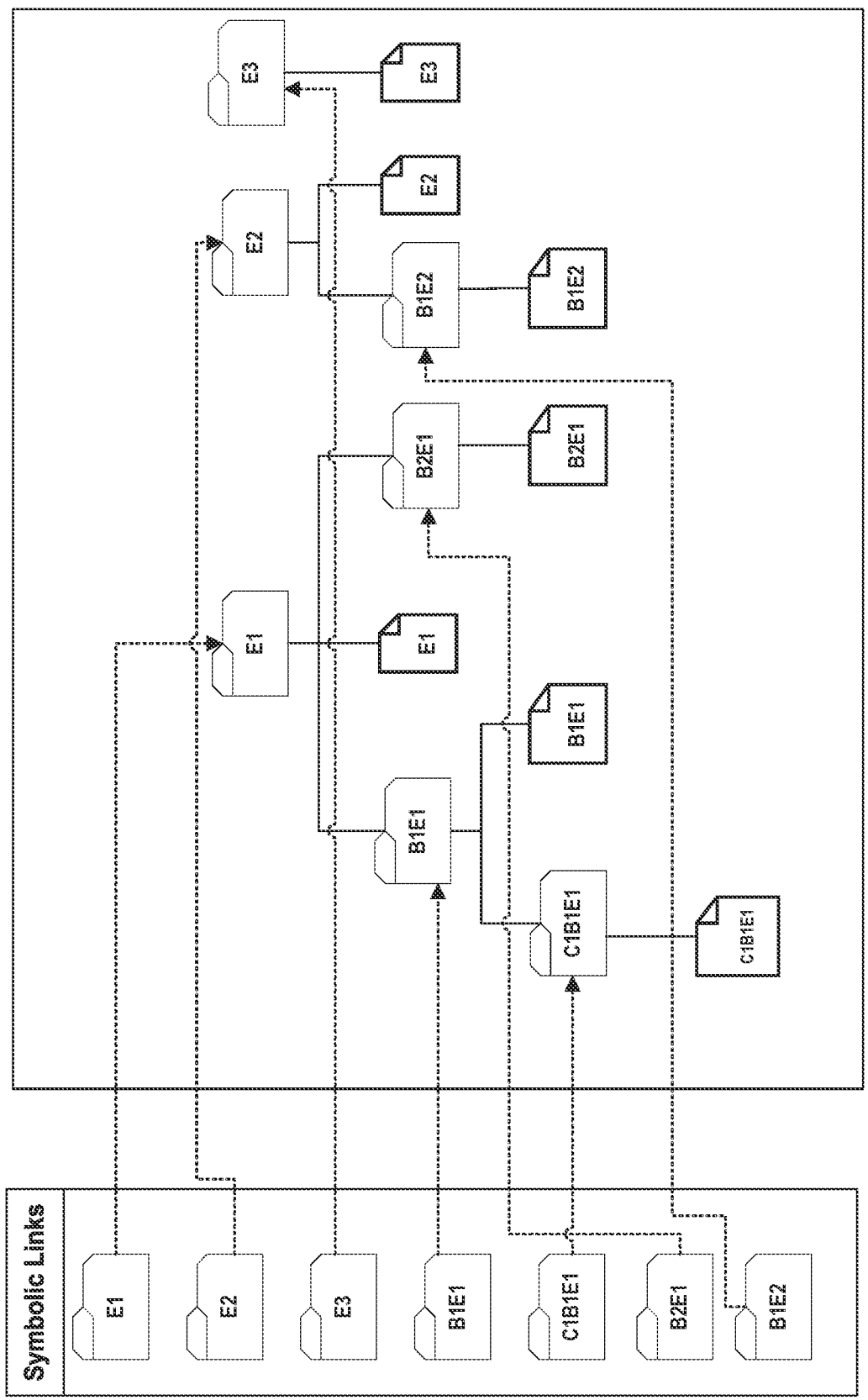
FIG. 3 illustrates a hierarchical directory structure in the database, in accordance with examples of the present disclosure.

FIG. 3 illustrates a hierarchical directory structure in the database 110, in accordance with examples of the present disclosure. The bit vector mapping information between individual entities and sampled signatures may be stored in individual directories. The directory hierarchy is organized to preserve a lineage of the parent entities, snapshots and clones. Each parent entity may have a parent directory in the database 110 which stores the bit vector files associated with the parent entity. Each snapshot is stored in a snapshot directory inside the parent directory. In examples described herein, directories of clones may be stored inside a snapshot directory, when the clones are derived from the snapshot. In another example, directories of clones may be stored inside the parent directory when the clones are derived from the parent entity. Each directory (i.e., parent directory, snapshot directory and clone directory) may include the bit vector file and intra-entity reference count (if present) file inside the respective directory. A pointer (or a symbolic link) is created for each entity (parent entity, snapshot and clone). The pointer is a link to access the bit vector file and the intra-entity reference count file in the database 110 of the entity. This allows data related to clones and snapshots to be retrieved without explicitly going through the entire lineage of the parent entities and snapshots.

Referring now to FIG. 3, the files E1, B1E1, B2E1 etc. may represent both bit-vector file and the intra-entity reference count file associated with the entity. The directories of snapshots generated from an entity may be considered as siblings and share the parent directory of the parent entity. The directories of clones generated from snapshots may be considered as siblings and share the snapshot directory. The snapshot directory acts as parent directory for the directories of the clones. In an example implementation, the writable entities (i.e., the clones and parent entities) may be at even levels in the hierarchy and the read-only entities (i.e. snapshots) may be at odd levels. In another example implementation, the clones may be at odd levels when the clone is generated from the parent entity.

The hierarchical directory structure allows maintaining a lineage between the parent entity and related snapshots and clones. This type of hierarchical directory may add intelligence during query processing by grouping related entities. This may lead to faster operations and reduced overhead while processing queries.

The database 110 is updated based on operations performed by a set of entities present in the storage system. The operations performed by the entities may result in changes in the sampled signatures associated with the sampled data units.

Write Operation

In an example embodiment, during I/O operation when data is being written (or overwritten) in the storage system and the data meets the sampling criteria, the database 110 is updated. For a sampled data unit, a mapping is created between the sampled signature and the associated entity and the mapping is stored in a bit vector file in the first data structure 112. The second reference count of the sampled signature is updated in the third data structure.

If the mapping between the sampled signature and the entity is already present in the first data structure, an intra-entity reference count of the sampled signature is incremented. In case the sampled signature is the second instance of the sampled signature associated with the entity, an intra-entity reference count is created for the sampled signature in the second data structure.

In some examples, if the sampled data unit is overwritten or deleted (removal of a sampled signature), the intra-entity reference count maintained for sampled signatures may be searched to determine if the sampled signature is present in any of the sampled signatures associated with intra-entity reference counts. This search may be performed using a bloom filter to minimize overhead and retrieve the results faster. If the sampled signature is present in sampled signature of intra-entity reference counts, the count of the sampled signature in the intra-entity reference count is decremented. Further, if the intra-entity reference count of the sampled signature is zero, the entry of the intra-entity reference count of the sampled signature is deleted from the database 110.

When the sampled signature is not found in sampled signature of the intra-entity reference counts, the bit vector associated with the sampled signature is cleared for that entity in the first data structure 112 and the second reference count of the sampled signature is decremented in the third data structure. For example, a "1" associated with a bit vector entry for the entity may be cleared.

Snapshot/Clone Creation

When a snapshot is created from a parent entity, a snapshot directory may be created inside the parent directory in the database 110. The bit-vector files of the entity may be copied into the snapshot directory. For example, the snapshot directory B1E1 is created inside the parent directory E1. Further, the second reference count of sampled signatures associated with the entity may be updated in the third data structure.

The update of the second reference count of the sampled signatures may be postponed to avoid overhead and delays in the snapshot creation. The updates to the second reference count are postponed using a "update pending" flag in the snapshot directory. A file indicating update pending flag is created in the directory of the snapshot. The update pending flags are tracked using a "update pending" list. The update pending list is maintained in a separate linked list in the memory and tracked using a background thread. The background thread is configured to run periodically or when a query is received from a client device.

The process involved in clone creation is same as that in snapshot creation. In cases where a clone is created from a snapshot, the snapshot may need to maintain an intra-entity reference count file which may be copied to the clone.

In some implementations, where creation of clones from snapshots is not supported, the tracking of intra-entity reference count may be avoided for the snapshots.

Entity Deletion

When an entity present in the database 110 is deleted, its directory, the pointer to the directory, associated bit vector files and associated intra-entity reference count tracker may be deleted. In addition, the second reference count of sampled signatures associated with the entity may be updated in the third data structure.

The update of the second reference count of the associated sampled signatures is postponed to avoid overhead. The updates to the second reference count are postponed using a "delete pending" flag and tracked using a "delete pending" list. The entries in the delete pending list are aggregated and processed by a background thread. The background thread is configured to run periodically or when a query is received from the client device.

The database 110 receives queries from client devices. The queries are processed based on the information available in the database 110. Example methods to process queries received at database 110 are described in methods 400 and method 500 in FIG. 4 and FIG. 5.

Figure 4:
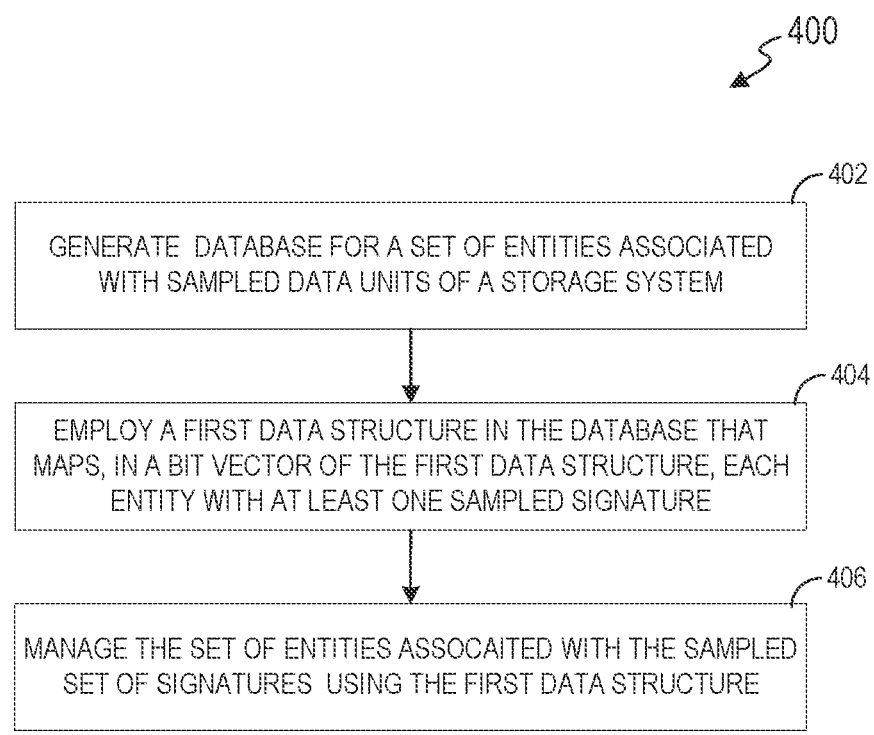
FIG. 4 is a flow diagram depicting a method of managing sampled data units in the storage system, in accordance with examples of the present disclosure.
Figure 5:
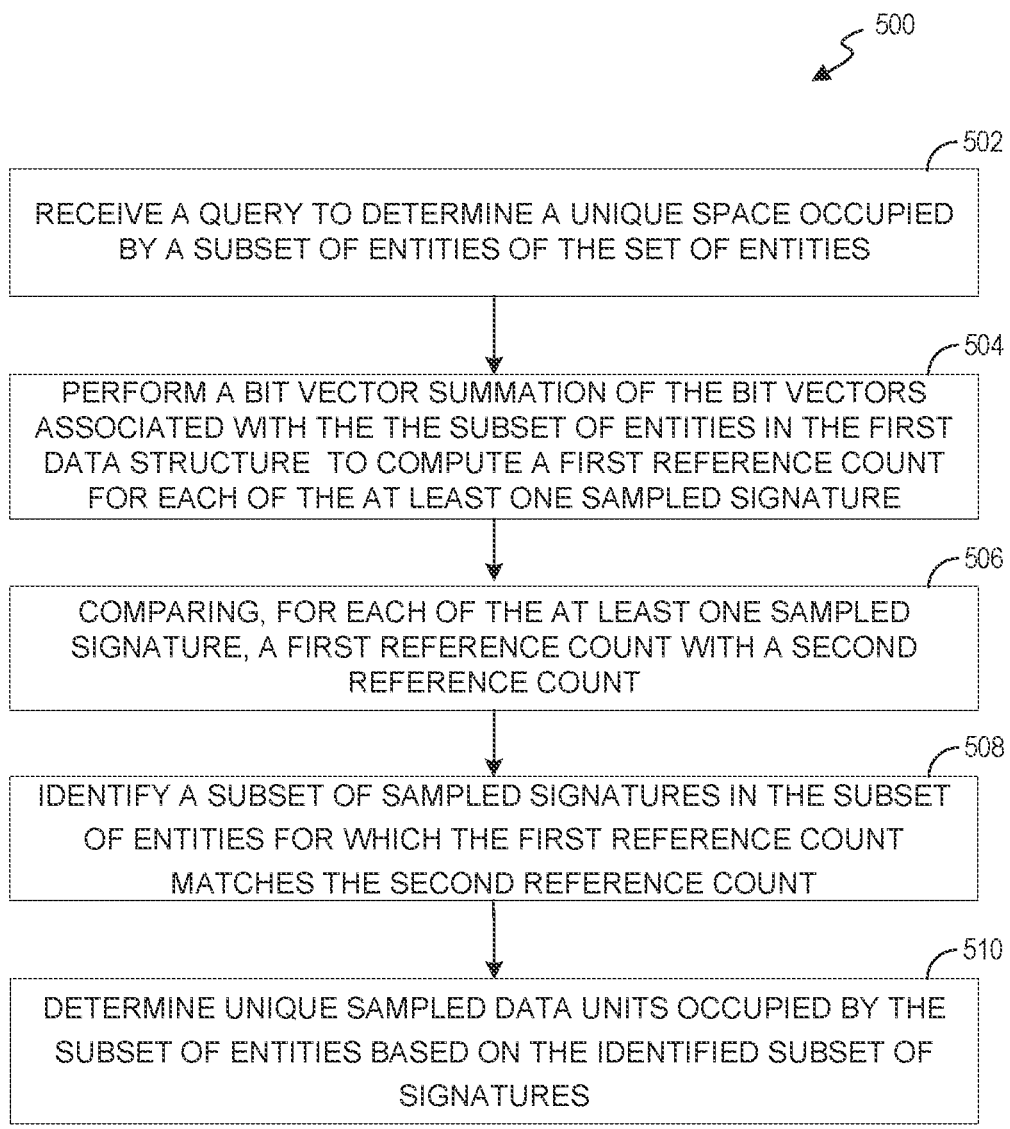
FIG. 5 is a flow diagram depicting a method for estimating a unique space occupied by a subset of entities in the storage system, in accordance with examples of the present disclosure.

FIGS. 4 and 5 are flow diagrams depicting various example methods. In some implementations, one or more blocks of the methods may be executed substantially concurrently or in a different order than shown. In some implementations, a method may include more or fewer blocks than are shown. In some implementations, one or more of the blocks of a method may, at certain times, be ongoing and/or may repeat. In some implementations, blocks of the methods may be combined.

The methods (400, 500) shown in FIGS. 4 and 5 may be implemented in the form of executable instructions stored on a machine-readable medium 104 and executed by a processing resource (e.g. such as processor 102) and/or in the form of electronic circuitry. In some implementations, the methods may be performed by a separate deduplication device in the storage system 100.

FIG. 4 is a flow diagram depicting a method 400 of managing sampled data units in the storage system 100, in accordance with examples of the present disclosure. In implementations, some or all of the steps of method 400 may be implemented by a processor 102 executing instructions that are stored in a machine-readable medium 104.

The method 400 may start in block 402, where the processor 102 generates a database 110 for a set of entities associated with sampled data units of the storage device 108. The set of entities may include parent entities, snapshots of the parent entities, snapshots of clones, clones of the parent entity, or clones of the snapshots. The sampled data units are selected based on a predefined sampling criteria. The information in the database 110 is updated based on the changes in the sampled data units during I/O operations. In addition, the database 110 gets updated when a new entity is detected in the storage system. The database 110 comprises of one or more data structures to represent and store data related to the sampled data units.

At block 404, the database 110 employs a first data structure 112 to map each entity with at least sampled signature in a bit vector of the first data structure 112. The first data structure 112 maintains a mapping between a set of entities found in the sampled data units and a set of sampled signatures associated with each of the sampled data units using bitmaps. The set of sampled signatures are associated with the set of sampled data units. Each entity in the first data structure 112 may be mapped to one or more sampled signatures in the set of sampled signatures. Each sampled signature may have a reference count indicating the number of entities referring to the sampled signature. This reference count is maintained in the first data structure 112 for all the entities. Each sampled signature is associated with a signature index (Idx) in the database 110. Each entry in the first data structure 112 is stored in the form of a bit vector. The mapping between each entity and the sampled signature is stored as a bit vector file. This type of bitmap type of representation of the sampled signatures in the first data structure 112 allows for faster bit vector operations on the first data structure 112.

The bit-vector files in the first data structure 112 may be stored in a compressed format to minimize the space required for the first data structure 112 in the memory 106.

In the bit vector mapping shown in FIG. 2A, a "1" indicates the presence of a sampled signature and "0" indicates absence of a sampled signature. For instance, the bit vector corresponding to (C1B1E1, S4) is "1" indicating that the clone C1B1E1 is associated with sampled signature S4. Similarly, a "0" indicates the absence of the signature. For example, the bit vector corresponding to (C1B1E1, S1) is "0" which indicates that signature S1 is not associated with C1B1E1. From, the FIG. 2A it can be identified that the sampled data units in the clone are associated with sampled signatures S3, S4 and S7. Each sampled signature may have a reference count indicating the number of entities referring to the sampled signature. The reference count is computed by performing a sum of bits in the column corresponding to a sampled signature.

In an example implementation, to maintain the space efficiency of the first data structure, compressed bitmaps may be used. Further, to avoid impact on I/O operations due to repeated compression & un-compressions of bit-vectors upon updates to the entities, only the bit-vectors of snapshots could be stored in compressed formats. Since the number of active entities in any system are limited by performance constraints and majority of the entities in them are snapshots, compressing only bit vectors of snapshots (while leaving bit-vectors of writable entities in uncompressed form) may retain the space efficiency.

At block 406, the method 400 includes managing the set of entities associated with the sampled set of signatures in the storage system 100 using the first data structure 112. Managing the set of entities associated with the sampled set of signatures includes keeping the database 110 updated with new sampled signatures, deleted entities, new entities, snapshot creations, and clone creations. Entities performing operations (write, delete, create) may result in change (or creation) of sampled signatures associated with the sampled data units which need to be updated in the first data structure 112.

In another example, managing of the set of entities associated with the sampled set of signatures includes processing queries received at the database 110. In an implementation, the database 110 may receive queries may related to unique space occupied by a subset of entities, or a rate of change in the subset of entities.

Capacity Estimation/Unique Space Computation

FIG. 5 is a flow diagram depicting a method 500 for estimating a unique space occupied by a subset of entities in the storage system, in accordance with examples of the present disclosure. The method 500 may start in block 502, where the database 110 receives a query to determine a unique space occupied by a subset of entities of the set of entities.

At block 504, the method includes performing a bit vector summation of the bit vectors associated with the subset of entities in the first data structure 112 to compute a first reference count for each of sampled signature associated with the subset of entities It is noted that the reference count (shown in FIG. 2A) against each of the sampled signatures in the first data structure 112 is the bit vector summation of the bit vectors associated with all the entities mapping the sampled signatures in the first data structure 112 and not a subset of entities as described in the method 500. It should be understood that the query for estimating unique space may be received for a specific entity, a subset of entities or all the entities present in the sampled data units. The first reference count may be computed for the specific entity or a subset of entities. When a query received at the database 110 is to determine the unique space occupied by all the entities in the set of entities, the reference count of the sampled signatures maintained in the first data structure 112 may be considered as the first reference count.

At block 506, the method includes, when the query received at the database 110 is to determine the unique space occupied the set of entities present in the sampled signatures, the reference count of the sampled signature maintained in the first data structure 112 is compared to a second reference count of a corresponding sampled signature in a third data structure.

The third data structures stores the second reference count of each sampled signature of the set of sampled signatures in the set of entities. The sampled signatures in the third data structure is updated based on the addition or removal of signatures from entities during I/O operations. The second reference count gets adjusted based on addition or removal of sampled signatures from the third data structure.

It is noted that the second reference count of the sampled signature maintained by the third data structure may not be an actual reference count of the sampled signature. The second reference count may indicate the number of entities referring to a sampled signature and may not consider the intra-entity reference count of sampled signatures.

In block 508, the method 500 includes identifying a subset of sampled signatures in the subset of entities for which the first reference count computed from the first data structure 112 matches the second reference count from the third data structure.

In block 510, unique sampled data units occupied by the subset of entities is determined based on the identified subset of signatures. The unique sampled data units occupied by the subset of signatures associated with the sampled data units may be extrapolated to compute a unique space occupied by the subset of entities in the storage system.

Consider an example, where a query is received at the database 110 to determine the unique space occupied by entities E1, B1E1 and C1B1E1 is received at the database 110. The entities are E1, B1E1 and C1B1E1 may be considered as a subset of entities present in the sampled data units. The bit vectors of entities E1, B1E1 and C1B1E1 are added (summation) to compute a first reference count for each of the sampled signature in the subset of entities. For entities E1, B1E1 and C1B1E1, the first reference count is computed (R1=2, R2=1, R4=2, R5=1, R6=1, R7=2) for the respective sampled signatures (S1, S2, S4, S5, S6 and S7).

The first reference count of sampled signatures S1, S2, S4, S5, S6 and S7 present in the subset of entities E1, B1E1 and C1B1E1 is compared with the second reference count of S1, S2, S4, S5, S6 and S7 in the third data structure.

When the first reference count of sampled signatures in subset of entities E1, B1E1 and C1B1E1 is compared to the second reference count of the corresponding sampled signature from the third data structure, it may be identified that reference counts (first, second) corresponding to sampled signature S5 associated with entity B1E1 is the same. The sampled signature S5 is unique and the sampled data units associated with sample signature S5 may be the unique sampled data units. The computation of unique space may not require data from the second data structure.

Change Rate Tracking

Figure 6:
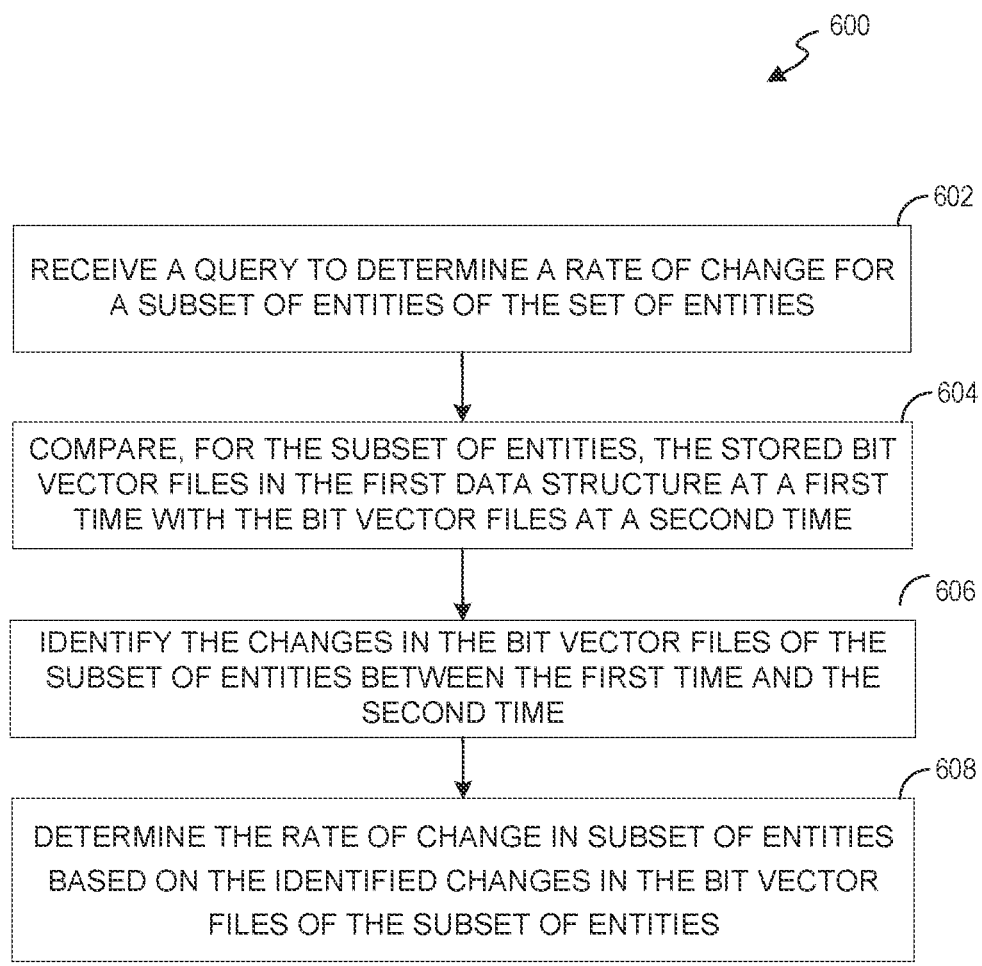
FIG. 6 is a flow diagram depicting a method for determining a rate of change for a subset of entities in the storage system, in accordance with examples of the present disclosure.

FIG. 6 is a flow diagram depicting a method 600 for determining a rate of change for a subset of entities in the storage system, in accordance with examples of the present disclosure.

The method 600 may start in block 602, where the database 110 receives a query from a client device to determine a rate of change in a subset of entities of the set of entities present.

At block 604, the processor 102 may compare the bit vector files for the subset of entities in the first data structure 112 at a first time with the bit vector files of the subset of entities in the first data structure 112 at a second time. The copies of the bit vector files of the entities and the intra-entity reference count may be generated at predefined intervals.

At block 606, the processor 102 may be configured to identify changes in the bit vector files of the subset of entities in the first data structure 112 between the first time and the second time. The processor 102 may determine the changes in the bit vector filed by performing an XOR operation between the bit vector files at the first time and the bit vector files at the second time.

At block 608, the processor 102 may be configured to determine a rate of change in the subset of entities based on the identified changes in the bit vector files. The difference in the first reference counts of the sampled signatures in the subset of entities between the first time and second time provides the rate of change in the subset of entities in the predefined interval. The rate of change computed may be extrapolated to compute the rate of change of the subset of entities in the predefined interval in the storage system 100. Based on the computed rate of change, a backup and retention policy for the subset of entities may be suggested to users.

Consider an example, when a rate of change of a Virtual Machine (VM) can be computed using the method 600. The predefined interval to compute the rate of change in the VM may be configured based on user requirements. Based on the rate of change an incremental backup of the VM may be performed.

Although the method 600 has been described by comparing the bit vector files of entities in the first data structure 112 at different intervals of time, it should be understood that computing the rate of change for an entity or a set of entities may include considering the changes in the intra-entity reference count of the entities between the first time and second time. In example embodiments, each entry in the intra-entity reference count may be labeled with a time stamp indicating the last modification time. The time stamp may be used to identify entries which changed between the first time and second time.

In some implementations, the database 110 may be queried to determine unique data units in snapshots. When multiple snapshots of a parent entity are present, the unique data units specific to a snapshot may be determined. The bit vector files of the snapshot are compared with bit vector files of other snapshots (sibling) generated from the same parent entity based on lineage present in the database 110. A bit wise XOR operation among the bit vector files of the snapshots may provide the sampled data units unique to specific snapshots in the sampled data units. The unique sample data units may be extrapolated to determine the unique data units in the specific snapshot. The unique data units in snapshots may be utilized to provide retention policies for snapshots.

Figure 7:
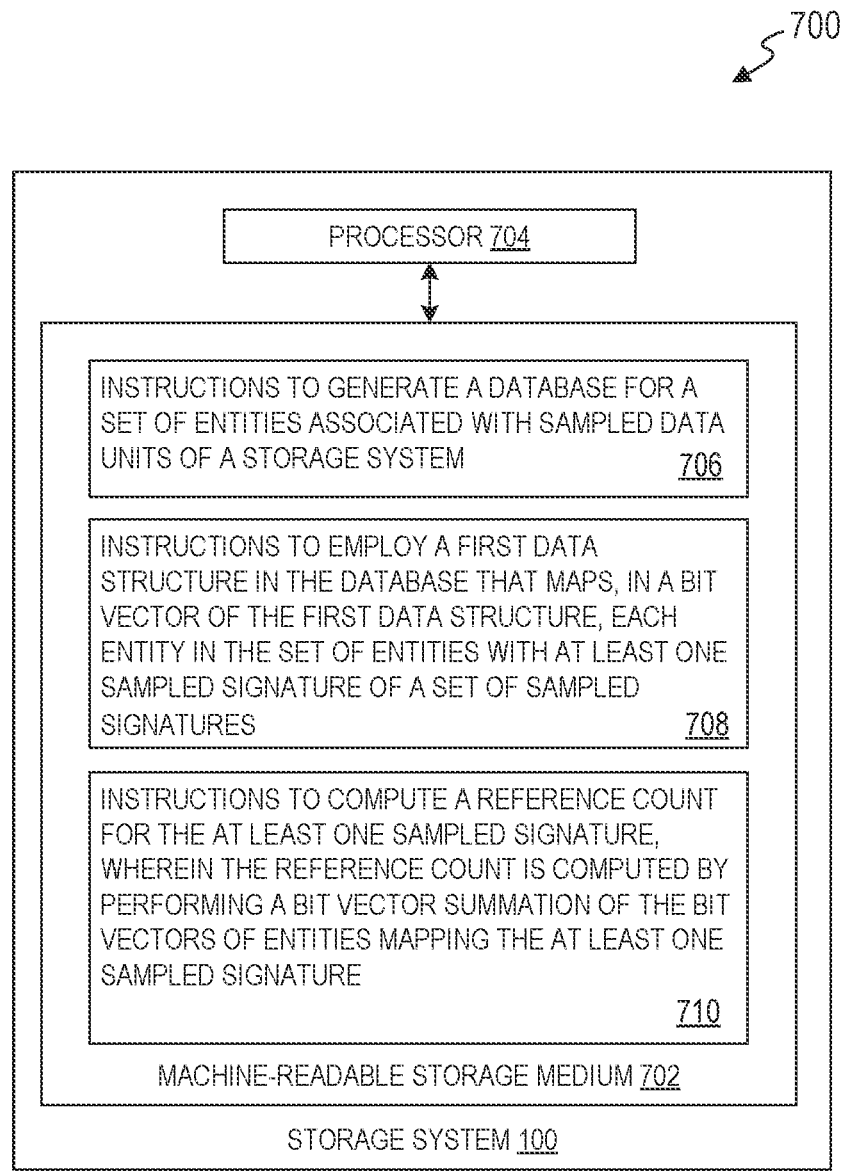
FIG. 7 illustrates an example computing environment, implementing a non-transitory computer-readable medium, according to example of the present disclosure.

FIG. 7 illustrates an example computing environment 700, implementing a machine-readable storage medium 702, according to example of the present disclosure. The machine-readable storage medium 702 may be utilized by a computing system, such as the storage system 100. In one implementation, the computing environment 700 may include the processor 704 communicatively coupled to the machine-readable storage medium 702 in the storage system 100. The machine-readable storage medium 702 may be, for example, an internal memory device. In one implementation, the machine-readable storage medium 702 includes a set of computer readable instructions, such as instructions corresponding to the database 110. The set of instructions (706, 708 and 710) may be accessed by the processor 704 and executed for managing the set of entities associated with the sampled set of signatures using a first data structure 112 in the storage system 100.

For example, at block 706, the instructions when executed cause the processor 704 to generate a database 110 for a set of entities associated with sampled data units of the storage device 108. The set of entities includes parent entities, snapshots of the parent entities, snapshots of clones, clones of the parent entity, or clones of snapshots. The database 110 comprises of one or more data structures.

At block 708, the instructions when executed cause the processor 704 to employ the first data structure 112 to map each entity with at least one sampled signature in a bit vector of the first data structure 112. Each entry in the first data structure 112 is stored in the form of a bit vector. The first data structure 112 maps the set of sampled signatures with the entities using bit vectors. Queries received at the database 110 may be processed based on the mapping of the entities with the sampled signatures. Queries received may be related to, unique space computation, entity specific queries, etc.

Further, at block 710, the instructions when executed cause the processor 704 to compute a reference count for the at least one sampled signature. The reference count is computed by performing a bit vector summation of the bit vectors of entities mapping the at least one sampled signature in the first data structure 112. Thus, the bit vector type of mapping allows faster retrieval of data from the entities and summation operation. The reference count indicates the number of entities referring to the sampled signature. This reference count is maintained in the first data structure 112 for all the entities.

In the foregoing description, numerous details are set forth to provide an understanding of the subject matter disclosed herein. However, implementation be practiced without some or all of these details. Other implementations may include modifications, combinations, and variations from the details discussed above. It is intended that the following claims cover such modifications and variations.

What is claimed is:

1. A method comprising:
generating, by a system comprising a hardware processor, a database for a set of entities associated with a plurality of sampled data units of a storage system, wherein the set of entities comprises a parent entity, and at least one of a snapshot of the parent entity, a clone of the parent entity, a snapshot of the clone of the parent entity, or a clone of the snapshot of the parent entity, and wherein the database comprises one or more data structures;
in response to an input/output (I/O) operation, accessing, by the system, a first data structure in the database that maps, in a bit vector of the first data structure, an entity in the set of entities with respective sampled signatures of a set of sampled signatures, wherein each respective entry of the bit vector indicates whether the entity refers to a respective sampled signature of the set of sampled signatures, and wherein corresponding sampled signatures of the set of sampled signatures are computed based on applying a function on corresponding sampled data units of the plurality of sampled data units;
comparing, by the system, the bit vector of the first data structure with a prior version of the bit vector;
controlling, by the system, a backup of the entity based on the comparing; and
receiving, by the system, a query to determine a rate of change for the entity, wherein the comparing of the bit vector to the prior version of the bit vector is in response to the query;
identifying, by the system, changes between the bit vector and the prior version of the bit vector; and
determining the rate of change for the entity based on the identified changes between the bit vector and the prior version of the bit vector.

2. The method of claim 1, further comprising:
computing, by the system, a reference count for a first sampled signature of the set of sampled signatures, wherein the reference count is computed by performing a bit vector summation of the bit vector with at least a second bit vector of the first data structure, the second bit vector mapping a second entity to respective sampled signatures of the set of sampled signatures, and wherein the reference count specifies a quantity of entities referring to the first sampled signature.

3. The method of claim 1, further comprising:
detecting, by the system, a generation of a new entity in the storage system; and
updating, by the system, the first data structure with a further bit vector mapping the new entity to respective sampled signatures of the set of sampled signatures.

4. The method of claim 1, wherein the parent entity is one of a file, a filesystem, or a volume.

5. The method of claim 1, further comprising:
employing, by the system, a second data structure in the database to track an intra-entity reference count of a first sampled signature of the set of sampled signatures, wherein the intra-entity reference count specifies a quantity of references to the first sampled signature by a first entity of the set of entities.

6. The method of claim 5, wherein the tracking of the intra-entity reference count comprises:
detecting a new sampled signature for a sampled data unit associated with the first entity;
determining if the new sampled signature is present in the second data structure for the first entity; and
incrementing the intra-entity reference count in response to determining that the new sampled signature is present in the second data structure for the first entity.

7. The method of claim 1, further comprising:
creating pointers for respective entities of the set of entities, wherein each pointer of the pointers is a link to access a respective bit vector stored in the database for a corresponding entity of the set of entities.

8. The method of claim 1, further comprising:
receiving, by the system, a query to determine a unique space in the storage system occupied by a subset of entities of the set of entities;
performing a bit vector summation of bit vectors in the first data structure associated with the subset of entities to compute first reference counts for corresponding sampled signatures of the set of sampled signatures;
accessing, by the system, second reference counts from a second data structure, each second reference count of the second reference counts representing a quantity of entities referring to a respective sampled signature of the set of sampled signatures;
comparing, by the system, for each corresponding sampled signature of the set of sampled signatures, a corresponding first reference count of the first reference counts to a corresponding second reference count of the second reference counts;
identifying, by the system, a subset of sampled signatures of the set of sampled signatures for which corresponding first reference counts computed from the first data structure match corresponding second reference counts in the second data structure; and
determining, by the system, the unique space occupied by the subset of entities in the storage system based on the identified subset of sampled signatures.

9. The method of claim 8, further comprising:
adjusting, by the system, a second reference count in the second data structure in response to I/O operations that add or delete data units with respect to the set of entities in the storage system.

10. The method of claim 1, further comprising:
storing, by the system, bit vectors in the first data structure in compressed format.

11. The method of claim 1, wherein the controlling of the backup of the entity is based on determined rate of change.

12. A system comprising:
a processor; and
a non-transitory machine-readable medium storing instructions that, when executed on the processor, cause the system to:
generate a database for a set of entities associated with a plurality of sampled data units of a storage system, wherein the set of entities comprises a parent entity, and at least one of a snapshot of the parent entity, a clone of the parent entity, a snapshot of the clone of the parent entity, or a clone of the snapshot of the parent entity, and wherein the database comprises one or more data structures;
in response to an input/output (I/O) operation, access a first data structure in the database that maps, in a bit vector of the first data structure, an entity in the set of entities with respective sampled signatures of a set of sampled signatures, wherein each respective entry of the bit vector indicates whether the entity refers to a respective sampled signature of the set of sampled signatures, and wherein corresponding sampled signatures of the set of sampled signatures are computed based on applying a hash function on corresponding sampled data units of the plurality of sampled data units;

compare the bit vector of the first data structure with a prior version of the bit vector;

control a backup of the entity based on the comparing; and compute a reference count for a first sampled signature of the set of sampled signatures, wherein the reference count is computed by performing a bit vector summation of the bit vector with at least a second bit vector of the first data structure, the second bit vector mapping a second entity to respective sampled signatures of the set of sampled signatures, and wherein the reference count specifies a quantity of entities referring to the first sampled signature.

13. The system of claim 12, wherein the instructions when executed on the processor cause the system to:

detect a generation of a new entity in the storage system; and update the first data structure with a further bit vector mapping the new entity to respective sampled signatures of the set of sampled signatures.

14. The system of claim 12, wherein the instructions, when executed on the processor cause the system to:

receive a request to determine a unique space in the storage system occupied by a subset of entities of the set of entities;

perform a bit vector summation of bit vectors in the first data structure associated with the subset of entities to compute first reference counts for corresponding sampled signatures of the set of sampled signatures;

access second reference counts from a second data structure, each second reference count of the second reference counts representing a quantity of entities referring to a respective sampled signature of the set of sampled signatures;

compare, for each corresponding sampled signature of the set of sampled signatures, a corresponding first reference count of the first reference counts to a corresponding second reference count of the second reference counts;

identify a subset of sampled signatures of the set of sampled signatures for which corresponding first reference counts computed from the first data structure match corresponding second reference counts in the second data structure; and determine the unique space occupied by the subset of entities in the storage system based on the identified subset of sampled signatures.

15. The system of claim 12, wherein the instructions, when executed on the processor cause the system to:

receive a request to determine a rate of change for the entity, wherein the comparing of the bit vector to the prior version of the bit vector is in response to the request;

identify changes between the bit vector and the prior version of the bit vector; and determine the rate of change for the entity based on the identified changes between the bit vector and the prior version of the bit vector.

16. The system of claim 15, wherein the controlling of the backup of the entity is based on determined rate of change.

17. A non-transitory machine-readable storage medium comprising instructions that upon execution cause a system to:

generate a database for a set of entities associated with a plurality of sampled data units of a storage system, wherein the set of entities comprises a parent entity, and at least one of a snapshot of the parent entity, a clone of the parent entity, a snapshot of the clone of the parent entity, or a clone of the snapshot of the parent entity, and wherein the database comprises one or more data structures;

in response to an input/output (I/O) operation, access a first data structure in the database that maps, in a bit vector of the first data structure, an entity in the set of entities with respective sampled signatures of a set of sampled signatures, wherein each respective entry of the bit vector indicates whether the entity refers to a respective sampled signature of the set of sampled signatures, and wherein corresponding sampled signatures of the set of sampled signatures are computed based on applying a hash function on corresponding sampled data units of the plurality of sampled data units;

compare the bit vector of the first data structure with a prior version of the bit vector; and control a backup of the entity based on the comparing;

receive a request to determine a rate of change for the entity, wherein the comparing of the bit vector to the prior version of the bit vector is in response to the request;

identify changes between the bit vector and the prior version of the bit vector; and determine the rate of change for the entity based on the identified changes between the bit vector and the prior version of the bit vector, wherein the controlling of the backup of the entity is based on determined rate of change.

* * * * *